United States Patent Office 3,307,279
Patented Mar. 7, 1967

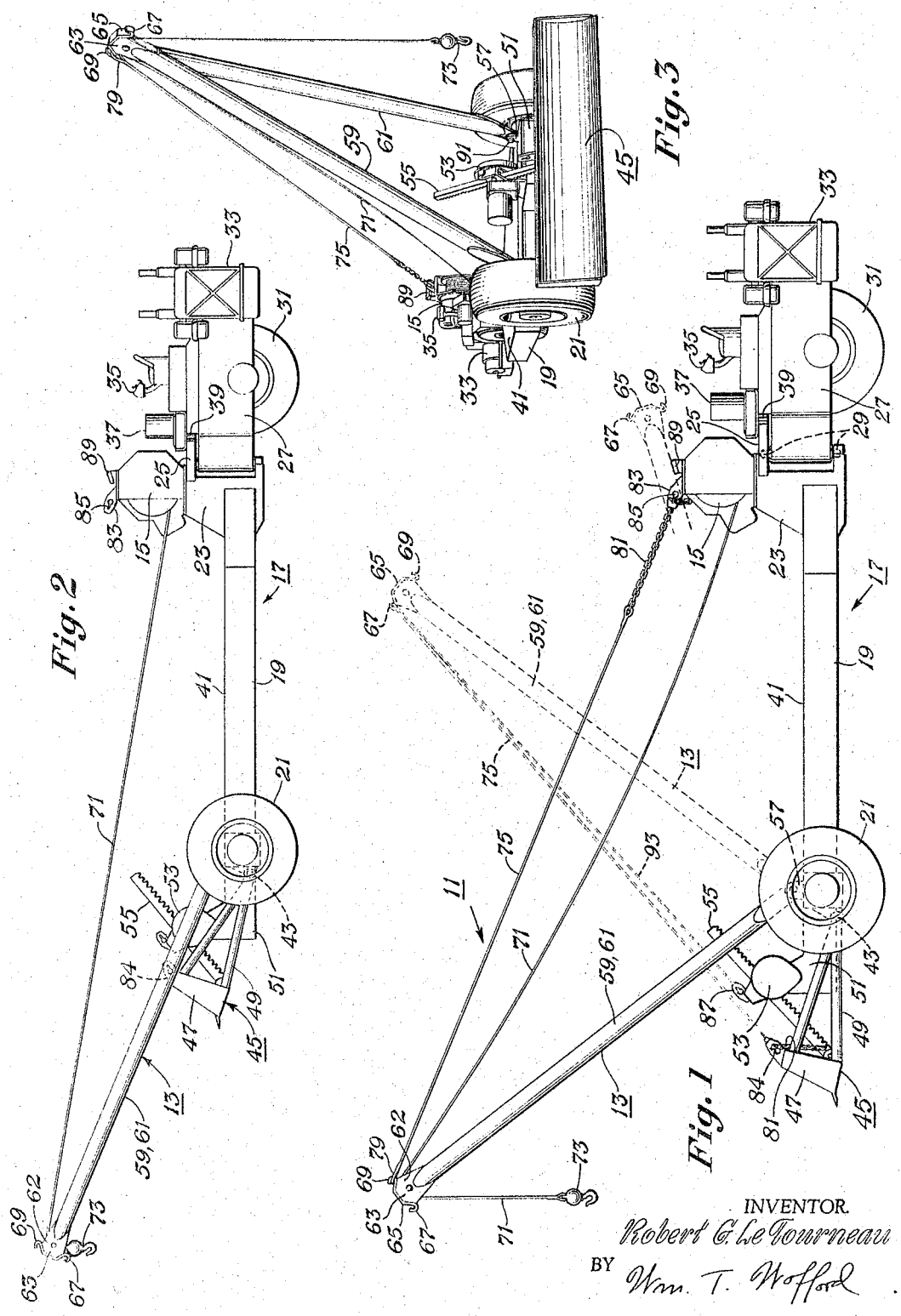

3,307,279
MULTI-PURPOSE WORK VEHICLES
Robert G. LeTourneau, P.O. Box 2307,
Longview, Tex. 75601
Filed June 12, 1964, Ser. No. 374,776
2 Claims. (Cl. 37—117.5)

My invention relates generally to a multi-purpose work vehicle, having particular utility in projects where heavy duty off-road type work machines are utilized.

Vehicles used for such projects are specialized to a large degree, frequently being adapted but for one purpose. Specialization, even though it usually leads to greater efficiency, sometimes limits the utility of machines to an excessive and disadvantageous degree. Specialized vehicles are often required to transport the various heavy work machines to and from the project site. Pioneer type work machines are often required to clear the way to the project when the terrain is rough or the undergrowth heavy. Moreover, special vehicles are required to assist machines that are immobilized for any reason and also to aid in the handling of some aspects of necessary maintenance and repair.

The necessity of providing separate vehicles for each function above-mentioned is inefficient and expensive, particularly since frequently, the auxiliary vehicles are idle. A more versatile vehicle is needed; that is, one which can economically perform a variety of functions.

It is therefore the general object of my invention to provide a versatile multi-purpose vehicle.

Another object is to provide an improved vehicle having pioneering and transport capabilities and also the ability to assist other machines when immobilized or otherwise incapacitated.

These and other objects are effected by my invention as will be apparent from the following description taken in accordance with the accompanying drawing, forming a part of this application, in which:

FIG. 1 is a schematic side elevational view of a vehicular mounted crane which utilizes a boom handling arrangement in accordance with the principles of the present invention.

FIG. 2 is a schematic side elevational view of the vehicular mounted crane of FIG. 1, showing the boom in an operative position; and FIG. 3 is a schematic perspective view of the vehicular mounted crane of FIG. 1, as viewed from the front end thereof.

Referring to the drawing, FIG. 1 illustrates a vehicular mounted crane 11 having a crane boom 13 and a hoisting winch 15, both of which are mounted on a vehicle 17. The vehicle 17 includes a chassis 19 upon which is mounted, adjacent its front end portion, an electric motor driven wheel and axle arrangement 21.

The rear end portion of chassis 19 is attached to a winch support structure 23, which supports a sector steering gear 25 disposed in a generally horizontal plane. The winch support structure 23, as well as the chassis 19, is pivotally connected to the front end of a rear wheel housing 27 by means of a pair of vertically disposed ball and socket arrangements 29. The rear wheel housing 27 is journaled to the electric motor driven wheel and axle arrangement 31, and in addition, provides support for a motor-generator power plant 33 (or other suitable source of motive power) and an operator's control station 35. There is mounted also on the rear wheel housing 27, an electric motor driven gear reduction unit 37, having an output pinion 39 which engages the steering sector gear 25. The chassis 19 has a substantially flat and level upper surface 41 which is adapted to support and carry loads when placed thereon.

Adjacent the front wheel and axle arrangement 21, and on each side of the chassis 19, is a ball and socket pivotal mounting 43 for an earthworking element, here shown as a dozer blade structure 45. The dozer blade structure 45 includes a conventional dozer blade 47 disposed across the front end of the main frame 19, and a pair of blade supporting arms 49, secured to the end portions of the dozer blade 47. Each such arm 49 is attached to the pivotal mounting 43.

Also at the front end of the chassis 19 is an upwardly projecting support structure 51 upon which is mounted an electric motor driven gear reduction unit 53, having an output pinion (not shown) which engages a length of rack 55. The rack 55 is pivotally connected to the dozer blade 47 adjacent one edge thereof. Also, there is fixed to the upper flat surface 41 of the chassis 19 a pair of crane boom support pivot brackets 57 which are located in spaced apart relation above and close to the front wheel and axle arrangement 21, as shown in FIG. 1. Thus, the boom 15 is pivotable about a horizontal axis which is normal to the vehicle longitudinal axis and parallel to the dozer pivot axis.

It will be noted from FIG. 3 that the crane boom 13 comprises two converging tubular members 59 and 61, preferably of circular cross section, which are each pivotally connected at one end to one of the respective boom support pivot brackets 57, and which are fixed at the converging ends to the cheek plates 62 of a head block or sheave 63. A heavy hook strap 65 is fixed to the front edges of the cheek plates 62 of the sheave 63 and is provided with hooks 67 and 69 at the ends thereof. A tension member, such as a conventional hoisting cable or wire rope 71, is wound on the hoisting winch 15 and threaded through the sheave 63 in the usual manner, while the free end of the wire rope 71 is secured to a conventional ball and hook 73, or to any other suitable load handling device.

The crane boom 13 is supported and maintained in any one of various selected operative positions by a crane boom support tension member 75 which comprises a convenient length of wire rope in one end of which there is formed a loop or eye 79, while the other end is secured to, preferably, a length of chain 81. It will be noticed by referring to FIG. 1 that the crane boom support tension member or vang 75 supports the crane boom 13 in a typical operative position, wherein the eye end 79 is looped over the hook 69 while the chain end 81 is releasably connected to a chain anchor 83, which is conveniently fixed to the winch 15. The chain anchor 83 comprises a heavy vertical plate member in which there is a keyhole-shaped aperture 85, disposed as shown in FIG. 1. Through the circular portion of the aperture, the chain 81 passes freely, but, in the slotted portion of the aperture, any one of the chain links may be seized and held. Thus, the crane boom 13 is freely pivotable and is maintained in any one of the various selectable operative positions by a tension member 75 releasably secured at one end to a respective crane boom hook 67, 69, and at the other end to the anchor device 83. A similar anchor device 84 is also fixed to the top edge of the dozer blade 47, for a purpose that will be evident later. For a related purpose, there is also fixed to the dozer blade gear reduction unit 53, an anchor device 87 which is similar to the anchor device 83.

When the crane boom 13 is not in service, or when the vehicle 11 is traveling relatively long distances, it may be inactively positioned on a boom rest 89 which comprises a pad, or other suitable structure, fixed conveniently to the top of the winch 15. The crane boom head, when positioned as shown in FIG. 1 by dotted lines, may of course be releasably secured to the boom rest 89 in any suitable manner.

It is apparent from the foregoing description that the pivotally mounted crane boom 13 and the pivotally mounted work element or dozer blade structure 47 are engageable, as is clearly shown in FIG. 2. If the dozer blade structure 47 is free to pivot from a horizontal to a vertical position, it can also move the crane boom 13 from a horizontal to a vertical position. In the embodiment shown, however, the rack 55 and output pinion (not shown) are not arranged to permit the dozer blade structure 47 to pivot through a large angle. Rather, the dozer blade structure will pivot only a limited and predetermined arc.

The crane boom 13 and the dozer blade structure 47 are adapted to cooperate with other elements on the vehicle 17, however, to provide an indexing means for raising and lowering the crane boom 13 in incremental steps.

To understand the crane boom handling arrangement of this embodiment, reference may be made initially to FIG. 1. It may be assumed, to begin with, that the crane boom 13 is in the stowed or inactive position and that it is free to pivot about a horizontal axis, normal to the vehicle longitudinal axis. The dozer blade 47 is first powered upwardly by actuating the motor driven gear reduction unit 53, through its predetermined and limited arc. While maintained there, the eye end 79 of the tension member 75 is connected to the hook 67 and the chain end 81 is connected to the chain anchor 84. Then, by powering the dozer blade 47 downward, the crane boom 13 will be pivoted upward from the stowed position to a first intermediate position, between the stowed position and an operative position. Such a first intermediate position is indicated in FIG. 1 by the dotted full length outline of the crane boom.

The next step in the procedure is to connect another similar boom support tension member 93 to the chain anchor 87, the eye end having been previously connected to the hook 67. This tension member 93 will hold and temporarily maintain the crane boom 13 in the first intermediate position while the dozer blade 47 is being powered upward again to its practical upper limit. The chain end 81 of the tension member 75 may now be shortened by securing another link of chain in the dozer blade chain anchor 84. Then, the crane boom may be pivoted upwards further, in the manner described, approximately to a nearly vertical position at which time the hoisting line 71 may be retrieved until the ball and hook 73 contacts the sheave 63.

Then, the dozer blade 47 may be powered downward again, moving the boom 13 over center or past the vertical position. From now on, however, the crane boom may be lowered and controlled by the hoisting winch 15 and the wire rope 71 until the crane boom 13 reaches a suitable operative position. Thereupon, the tension member 75 may be connected to the boom 13 and chain anchor device 83, as described previously to hold and maintain the crane boom in position; the ball and hook 73, of course, being free thereafter to operate for its intended purpose. It will be apparent that the tension member 75 may be readily released and the boom 13 may be disposed in any one of several operative positions, simply by changing the link which engages the slotted portion of the aperture 85. Thus, the boom may be moved in incremental steps from the inactive position to the various operative positions and vice versa, by the indexing action of the apparatus as above-described.

In some applications it is desirable to use the crane boom in a position that is nearly straight-out and forwardly extending, or generally as shown in FIG. 2. In such a situation, the crane boom is lowered by the wire rope 71 until the boom 13 rests on, and is engaged by the dozer blade 47 at a region intermediate the boom length; it being understood that the tension member 75, in this instance, is not necessarily used. Then, by simply powering the dozer blade 47 upward or downward the crane boom 13 may be disposed and held in a selected operative position. The crane boom 13, when so positioned, may be used to haul material or objects, that are located at some distance from the crane vehicle, toward the vehicle and into the normal range of lifting operations. After the object has been hauled up close to the vehicle, the crane boom may be raised by powering the dozer blade upward, or by tensioning the wire rope 71, or both, to one of the usual operative positions. The tension member 75 may then be reconnected for the purpose already described, and the object lifted in the usual manner.

In some hauling applications it is desirable to utilize the dozer blade 47 as a deadman. In such cases the dozer blade may be lowered to engage and dig into the ground. Then, when the wire rope is connected to a massive, heavy object such as, for example, a vehicle mired in mud or bogged down in sand, the dozer blade provides an effective deadman stop for the vehicle; it being held fixed relative to the object to be hauled.

That the crane 11 may be conveniently used to handle material on the flat bed upper surface 41 is evident by referring to FIG. 1. After the boom 13 has been raised to the first intermediate position in the manner previously described it may be maintained thereat by simply connecting the tension member 93 in the manner described. The sheave 63 will, in such position, be useful to guide the wire rope 71 in loading or unloading material from the flat bed upper surface 41.

It is apparent from the foregoing structural and operational description that I have provided a versatile multi-purpose vehicle capable of effectively performing a variety of functions. The embodiment shown and described has pioneering and transporting capabilities in addition to the ability to assist machines which are immobilized or otherwise incapacitated.

Another advantage of my vehicle is the manner in which the boom may be erected by use of a dozer blade, or other earth engaging apparatus that is pivotally mounted to the vehicle. It should be apparent that the dozer blade is useful to raise the boom from not only the stowed position, but also the essentially straight-out forward hauling position.

Another advantage is the manner in which the boom is raised from essentially a straight-out, forward position to the first intermediate position. In this operation, the boom may be raised by the hoisting cable or wire rope 71 to an almost vertical position, at which time the tension member 75 is connected to the chain anchor 84 on the already lowered dozer blade. Then, when the boom is moved past the vertical position, the dozer blade may be powered upward while the tension member 75 will provide control of the rearward pivotal movement of the boom 13.

The foregoing disclosure and the showings made in the drawing, are merely illustrative of the principles of this invention and are not to be interpreted in a limiting sense.

I claim:
1. A multi-purpose work vehicle comprising:
   (a) a chassis;
   (b) a freely pivotable crane boom mounted on said chassis adjacent one end portion of the vehicle to pivot about a horizontal axis which is normal to the vehicle longitudinal axis;
   (c) a winch mounted on the chassis near the opposite end portion thereof;
   (d) a flexible tension member partially wound on said winch and threaded through sheave means carried by the crane boom at the outer end portion thereof with said flexible tension member having a free end portion adapted to engage the crane boom sheave means as said flexible tension member is wound on said winch, so that said crane boom may be pulled over center and toward an inactive position;

(e) a dozer blade mounted to pivot about an axis parallel to said horizontal axis and protruding outwardly therefrom, said dozer blade being powered to pivot through a predetermined and limited arc, and engageable with said crane boom when gravity urges said crane boom toward said dozer blade; and (f) an indexing means for lowering or raising said crane boom in incremental steps toward or from the over-center inactive position, with said indexing means including a first tension member releasably secured to the dozer blade and to the crane boom to lower or raise said crane boom as the dozer blade pivots upwardly or downwardly through its limited and predetermined arc, and a second tension member releasably secured to the crane boom and to the chassis at a point on said one end portion thereof with said horizontal axis disposed between said point and the chassis opposite end portion so that the crane boom may be retained while the dozer blade is positioned for another indexing step.

2. A multi-purpose work vehicle comprising:
(a) a chassis;
(b) a freely pivotable crane boom mounted on said chassis adjacent one end portion of the vehicle to pivot about a horizontal axis which is normal to the vehicle longitudinal axis;

(c) a dozer blade mounted to pivot about an axis parallel to said horizontal axis and protruding outwardly therefrom, said dozer blade having a portion engageable with the crane boom at a region intermediate the length thereof;

(d) powered means for pivoting said dozer blade; and (e) with said dozer blade being interconnected with the crane boom by means comprising a tension member releasably secured to and spanning between the dozer blade and the crane boom when the blade and boom are positioned so that gravitational forces urge them away from each other.

References Cited by the Examiner

UNITED STATES PATENTS

| 2,301,808 | 11/1942 | Mosher. |
| 2,713,218 | 7/1955 | Dyer _____ 37—117.5 |
| 2,770,895 | 11/1956 | Rymkevitch _____ 37—117.5 |
| 3,028,697 | 4/1962 | Bator _____ 37—117.5 X |
| 3,033,524 | 5/1962 | LeTourneau _____ 37—144 X |
| 3,049,186 | 8/1962 | Garrett _____ 37—117.5 X |
| 3,161,072 | 12/1964 | LeTourneau _____ 37—2 X |

ABRAHAM G. STONE, *Primary Examiner.*

R. L. HOLLISTER, *Assistant Examiner.*